June 1, 1937.  O. H. HUNT  2,082,109
SWITCH MECHANISM FOR CONTROL APPARATUS
Filed Aug. 29, 1933   4 Sheets-Sheet 1
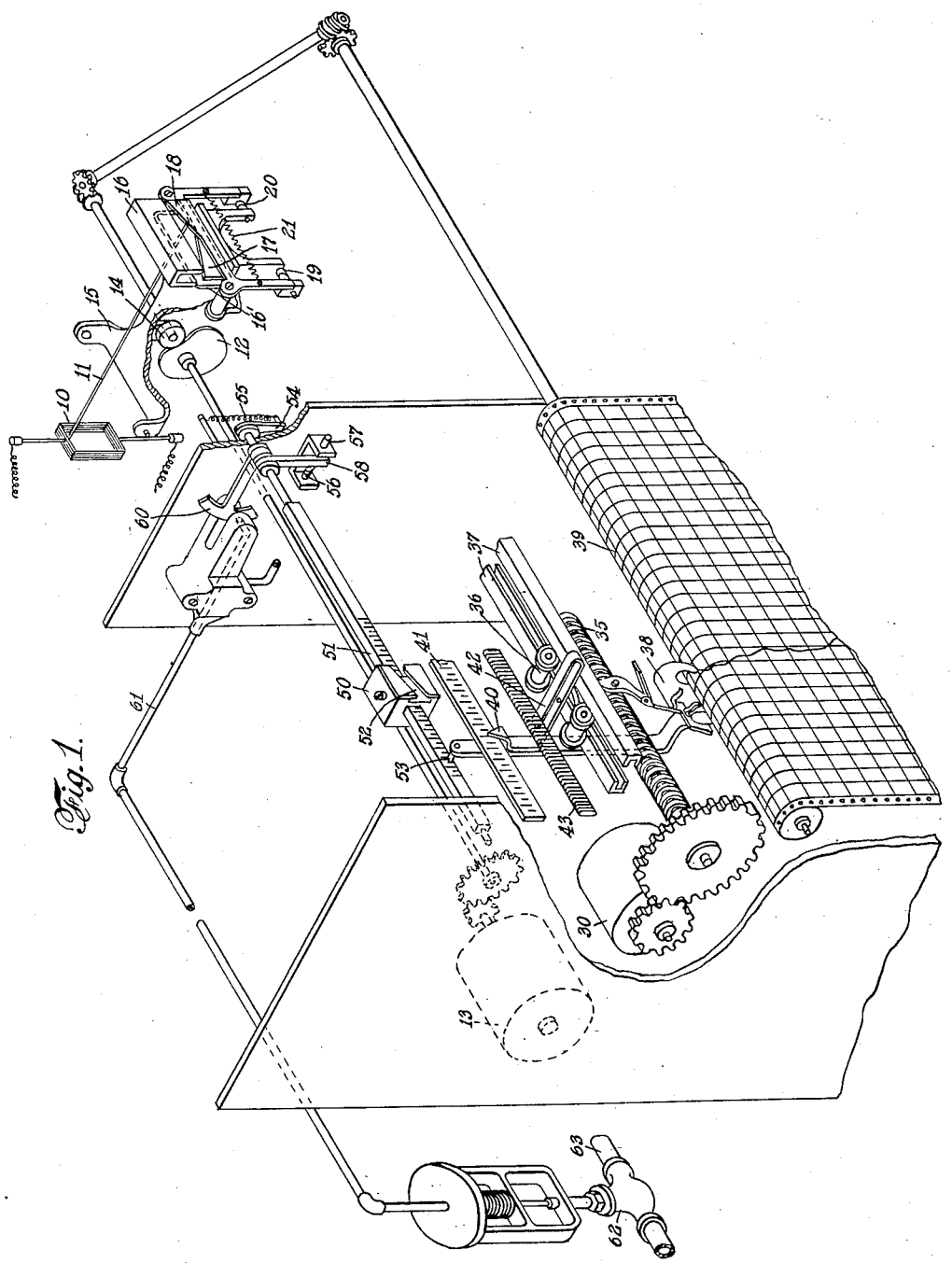
INVENTOR
*Ozro H. Hunt*
BY
ATTORNEY June 1, 1937.  O. H. HUNT  2,082,109
SWITCH MECHANISM FOR CONTROL APPARATUS
Filed Aug. 29, 1933  4 Sheets-Sheet 2
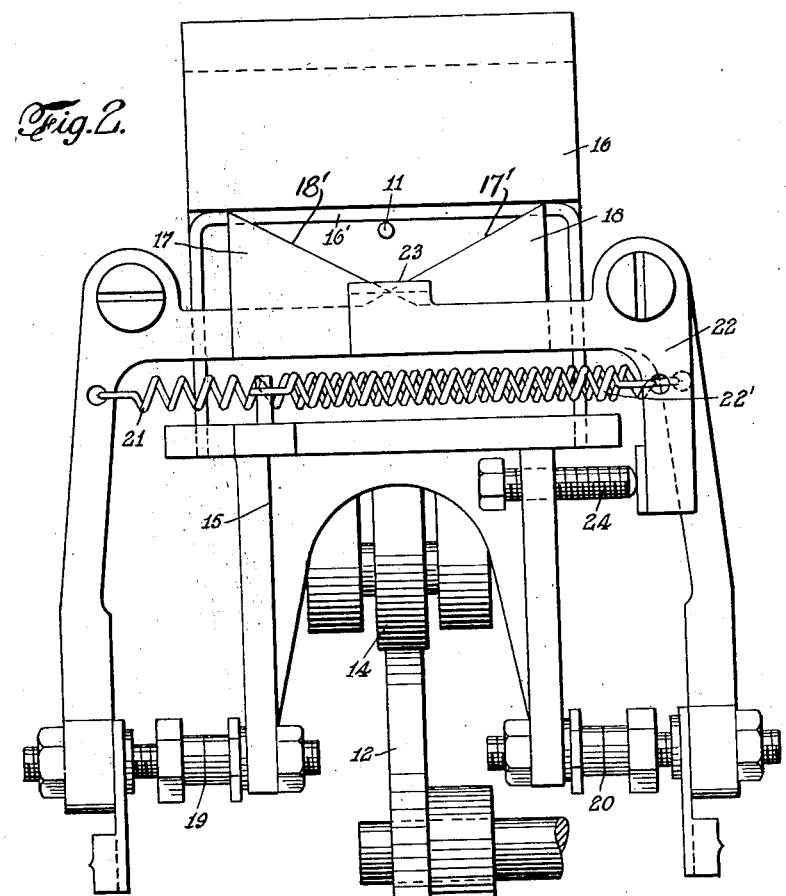
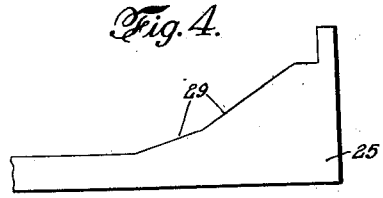
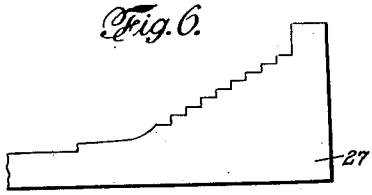
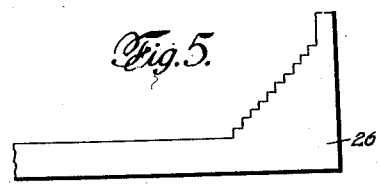
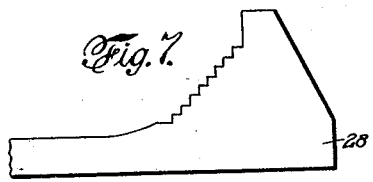
INVENTOR
*Ozro H. Hunt*
BY
*Fred'k F. Schuetz*
ATTORNEY

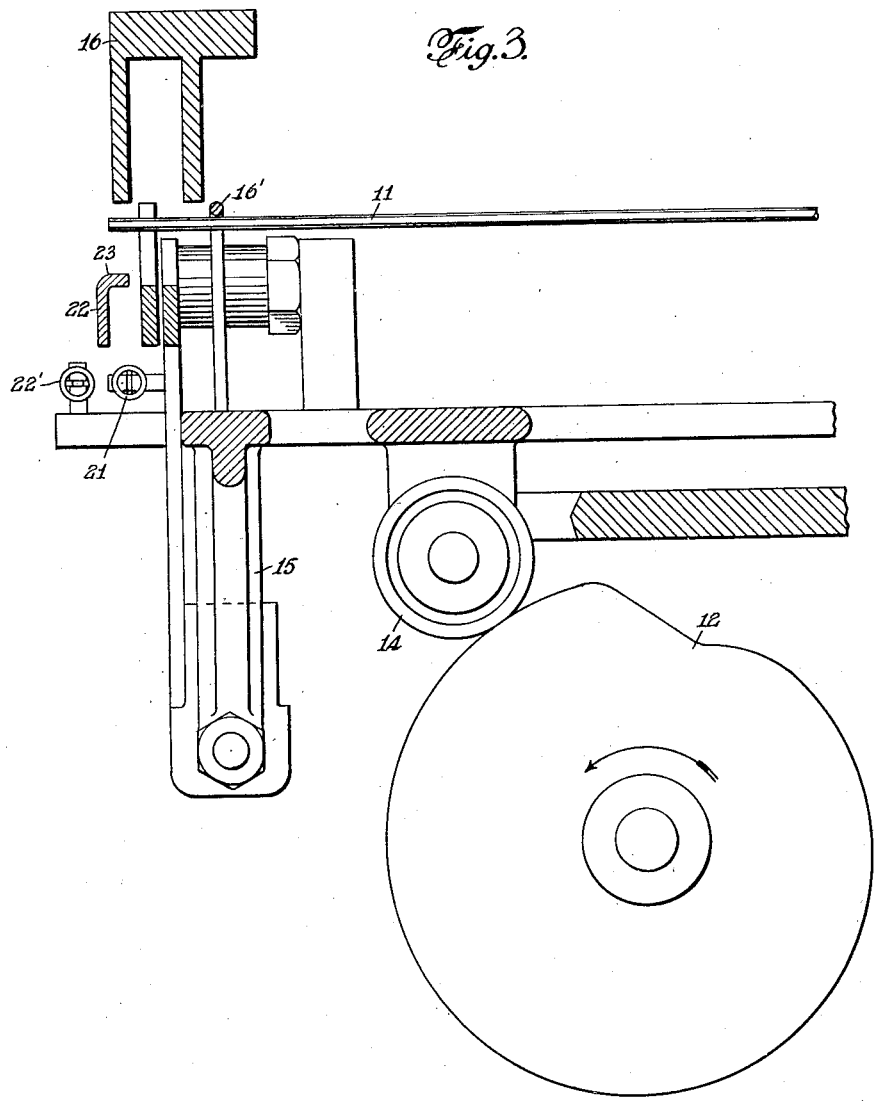

June 1, 1937.　　　　O. H. HUNT　　　　2,082,109
SWITCH MECHANISM FOR CONTROL APPARATUS
Filed Aug. 29, 1933　　　4 Sheets-Sheet 4
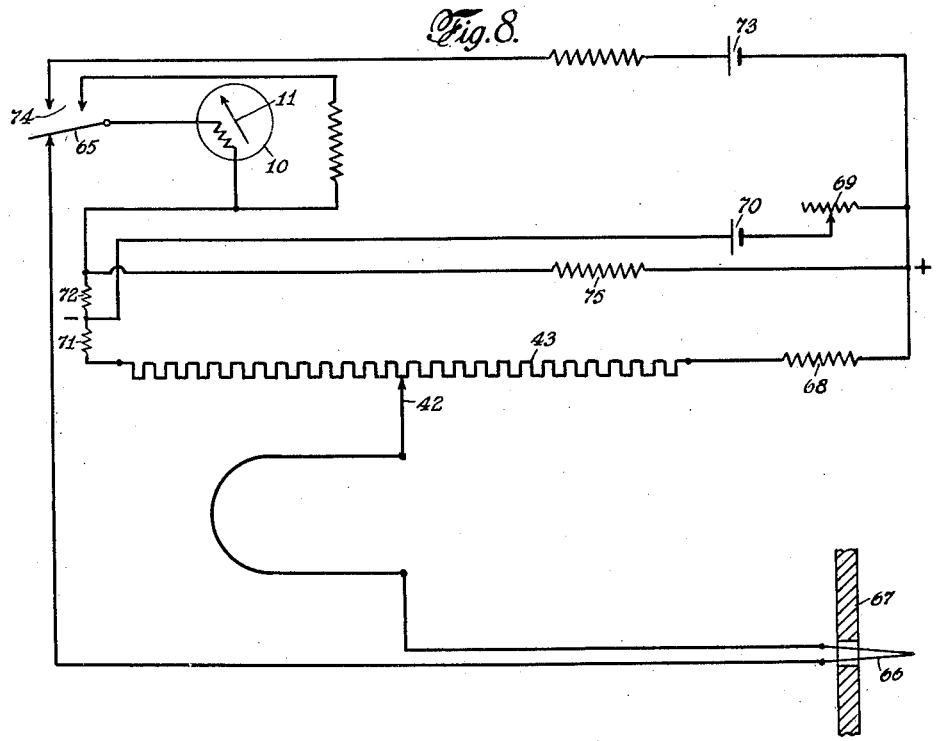
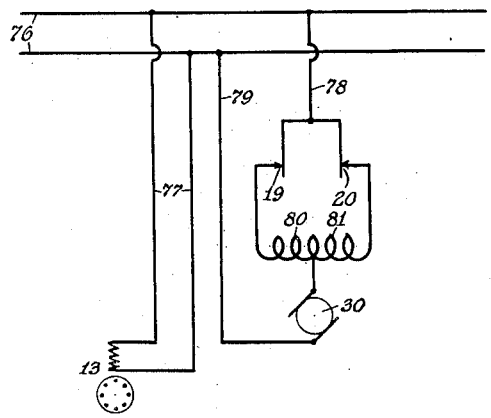
INVENTOR
Ozro H. Hunt
BY
ATTORNEY Patented June 1, 1937

2,082,109

UNITED STATES PATENT OFFICE 2,082,109

SWITCH MECHANISM FOR CONTROL APPARATUS

Ozro H. Hunt, Waterbury, Conn., assignor to The Bristol Company, Waterbury, Conn., a corporation of Connecticut Application August 29, 1933, Serial No. 687,330

7 Claims. (Cl. 200—56)

The invention relates to a system of and apparatus for indicating and recording a physical, electrical, chemical, mechanical condition or quantity, or any other condition or quantity which may be represented by an electromotive force, and changes or variations therein; also, to the control or maintenance thereby of these conditions, and, for example, a system and apparatus of the type disclosed in U. S. Letters Patent #965,824 and #1,841,558.

In apparatus of this nature, a movable pointer, such as the indicator needle or pointer of a sensitive electrical measuring instrument, as a galvanometer, is actuated by variations in the condition to be measured and/or controlled through changes set up thereby in the applied electromotive force. While the pointer is free to move most of the time, it is also arranged to be periodically engaged, when deflected from a predetermined position, by means which serve to set in operation more substantial mechanism designed to record the magnitude of the condition and/or affect controlling mechanism of a nature to restore the altered condition to the desired predetermined state.

With a system of this type, it is desirable that the recording and restoring mechanism be of a rugged nature and such as to respond rapidly under actuation of the pointer member; and it is an object of the present invention to provide rugged and substantial mechanism which will respond with maximum fidelity; also, to effect this operation without having any electric current to pass through the pointer, and without false electromotive forces being introduced into the measuring circuit.

A further object of the invention is to afford simple and effective mechanism for accomplishing the desired result and wherein all mechanical friction devices and like expedients have been eliminated, and wherein also no lost motion and like errors are introduced into the measurement.

Another object of the invention resides in the provision of means whereby the deflection of the measuring instrument pointer will be magnified in the movement of the recording and control elements and to such an extent that, for example, a rugged galvanometer having a short period may be utilized in an apparatus designed to operate over and record low ranges. For example, a deflection of the galvanometer pointer of the order of magnitude of 0.001" will produce a measurable movement of the recording element and associated controlling element.

A still further object of the invention contemplates the elimination for this purpose of such apparatus as vacuum tubes, photo-electric cells, optical systems and the like, and which are more or less subject to failure and require careful and frequent adjustment and attention.

The invention has for another object the provision of a system which will be applicable for various purposes and which may be embodied in different forms and modifications with a minimum number of changes or rearrangement of its structure; also, which will admit of the use therein of a reversible type of motor providing for extremely rapid response.

Still another object of the invention resides in the provision of apparatus suitable for multiple recording and/or control.

In carrying out the invention, the movable pointer member of a galvanometer or like measuring instrument, responding to changes in the condition to be measured and/or controlled as through the effect of the condition upon a thermocouple or other electromotive force-producing element, is caused to be engaged (when deflected from a predetermined position as under voltage variations resulting from change in the condition) by means which are designed to control the circuit of a motor of the reversible type. This motor, when thus actuated, is designed to feed a carriage provided with a marker which is movable thereby over a suitable recording surface and in accordance with the magnitude of the variations. The particular position of the marker will then be a measure of the magnitude of the condition whose variation has influenced said pointer.

In addition, the movement of the carriage is arranged to be communicated to a contact-making element which is designed to move over a resistance. This resistance with its associated slidable contact-making element is in circuit with the electro-sensitive member subject to the condition under control, such as a thermocouple, the unbalanced portion of electromotive force developed by the couple serving as the force for actuating the pointer and the full value of which potential represents the condition under measurement and/or control.

The said carriage, furthermore, may communicate its movement to an actuating element adapted for engagement at a predetermined, but adjustable, position with a cam element designed to regulate a controller mechanism which, in turn, provides for the maintenance of the condition under measurement and control.

In order to effect a rapid action by the position-controlling motor for the carriage, provision is made for a motor subject to excitation in opposite senses from two circuits and in such a manner that when both circuits are energized (or dead), the respective rotative efforts balance out, with no resultant tendency toward rotation.

Furthermore, two pairs of suitable contacts controlled by the pointer member are arranged to apply operating current to the motor; but only when one or the other of said pairs of contacts is open will the motor be caused to operate, the opening of both pairs of contacts also causing the motor to stop. A motor of this type will be caused to start and stop within a fraction of a revolution.

The nature of the invention, however, will best be understood when described in connection with the accompanying drawings, in which:

Fig. 1 is a perspective view of the novel measuring and control apparatus.

Fig. 2 is an enlarged fragmentary front elevation of the motor control mechanism and also illustrating a modification; and Fig. 3 is a transverse section thereof.

Figs. 4 to 7 are elevations of different forms of chopper arms which may be utilized.

Fig. 8 is a diagrammatic view illustrating the balancing circuit, and Fig. 9 is a similar view illustrating the general arrangement of apparatus and circuits.

Referring to the drawings, more particularly Fig. 1 thereof, a sensitive measuring instrument such as a galvanometer is indicated at 10, the same being adapted in the present embodiment to respond to changes in electromotive force of a potentiometer or Wheatstone bridge circuit and caused by an element subject to the condition to be measured and/or controlled. This galvanometer is designed to move a pointer element 11 in conformity with the changes in potential applied to the galvanometer, and the said pointer is arranged to move with respect to so-called "chopper" mechanism for operating additional circuits accordingly as the pointer moves to one side or the other of a neutral and predetermined position.

As shown, this mechanism comprises a cam 12 which is rotated at a constant speed from a motor 13 and is adapted to engage a cam follower 14 attached to an oscillatable bracket 15. This bracket carries the contact mechanism between which and a fixed or anvil member 16 pointer 11 is adapted to swing freely until the contact mechanism is elevated. The latter includes a pair of pivotally mounted chopper arms 17 and 18 having respective oppositely inclined surfaces 17' and 18', adapted for engagement with the pointer 11, and carrying respectively at their opposite ends the movable elements of cooperating contacts 19 and 20. When in the neutral predetermined position, pointer 11 will not necessarily be engaged by an inclined surface of the contact mechanism but when deflected to one side or the other thereof, one or the other of a pair of chopper arms surfaces 17' or 18' will contact therewith during the upward movement of the contact mechanism and operate one or the other of the contacts 19 and 20. As the contact mechanism is again depressed through further rotation of cam 12, a spring 21 serves to restore a contact to its normal position, which, in the present embodiment, is a closed position. It will be noted, furthermore, that the engaging surfaces of the chopper arm are inclined so that the duration of operation is not only determined by the shape and speed of rotation of the cam, but also by the degree of inclination or contour of the chopper arms and the extent of deflection of the pointer from its zero or mid-position.

Where relatively small movements of the metering element of pointer 11 are involved, that is to say for close control at or near the balance position, provision is made for preventing any tendency of the pointer to slide along one or the other of the inclined surfaces of the chopper arms 17 or 18 and thus reduce the required period of contact opening. To this end, a bell crank 22 with the surface 23 of one arm parallel to the swing of the pointer and normal to the direction of elevation of the contact mechanism, is pivotally mounted on said mechanism to swing about the same pivotal point as the chopper arm 17; and is spring-urged by a spring 22' in a direction toward the same pointer. An adjustable stop 24 engages the opposite arm of the bell crank to limit the position of the said parallel surface with respect to the pointer. In the provision of the surface 23, which is located in front of the chopper arms and at an elevation such that if the pointer is at or near its neutral position, it will be engaged by the surface 23 prior to engagement of the inclined surfaces of the chopper arms, a secure, non-sliding clamp is had between said pointer and the said surface.

For insuring clearing of the pointer in case of possible sticking to the anvil member 16, a U-shape stripper member 16' is mounted over pointer 11 and is secured to and moves with the reciprocating mechanism 15 so that in its downward movement it may engage the said pointer.

As indicated in Figs. 4 to 7, the contour of the engaging surfaces of the chopper arms 25, 26, 27, and 28 may be provided with the non-uniform surfaces 29, Fig. 4, and also may be stepped, as shown in Figs. 5–7. Different combinations of the surface of a chopper arm may be had in conformity with the control desired.

The contacts 19 and 20 are designed to control, in the present instance, the operation of a further motor 30 for a period proportional to the extent of said change and by increments whose magnitudes are dependent upon the extent of movement of said needle. It will, of course, be understood that the novel contact-making mechanism is of general application. The motor is of the reversible type and preferably of such a nature (see U. S. Patent #1,376,633) that when subjected to excitation in opposite senses from the two energizing circuits 31 and 32, controlled by the contacts 19 and 20, respectively, the respective rotative efforts balance out, with no resultant tendency toward rotation.

Thus, the motor 30 remains inoperative so long as both the contacts 19 and 20 remain closed but when one or the other of the same is opened as hereinbefore set forth, the motor is operated in the corresponding direction. Motor 30 is designed, also, to drive a feed screw 35 and through the same the carriage 36 reciprocably mounted upon tracks 37. This carriage is designed to carry a marking pen 38 movable over a record chart 39 which is also driven through intermediate mechanism from the motor 13.

A further pointer 40 may move with the carriage 36 over a scale 41 for indicating the particular condition under control, and for calibration of the chart 39.

Furthermore, carriage 36 moves a slider contact 42 over a slide wire 43 with both of which the galvanometer coil 10 is so connected in circuit with a source or sources of E. M. F. that for certain values thereof, or resistance to be measured, there are corresponding positions on the slide wire 43 in which the galvanometer coil will not be deflected from its central position. This is more fully set forth hereinafter in connection with the description of Figs. 8 and 9 of the drawings.

In addition, the carriage, through a continuation of the indicating arm 40, may be caused to actuate controlling mechanism for restoring the condition under measurement to a predetermined value and maintaining it substantially thereat. To this end, a control cam 50 may be adjustably mounted along a rod 51 which is oscillatable about its longitudinal axis, the cam being provided with a cam groove 52. When the control position is then attained by the arm 40, a pin 53 secured to its upper end will engage the cam groove 52 and correspondingly rock rod 51 about its axis. A spring toggle mechanism embodying the arm 54 is secured to rod 51 and the spring 55 is designed to hold the rod into an angular position at one side or the other of a middle position as the cam is caused to rotate the same beyond said middle position.

Adjustable stops 56 and 57 are arranged for engagement with an arm 58 secured to rod 51 to limit the throw in either direction. Rod 51 carries also a control or vane member 60 which is movable with the rod and is designed to control the pressure of a fluid medium within the piping system 61, as is more fully set forth in U. S. Letters Patent No. 1,880,247, in accordance with the throw of the rod. The pressure in piping 61, in turn, controls the operation of a valve 62 for regulating the supply, for example, of a heating medium through the main 63, as is well understood and as is more fully set forth in the aforesaid Letters Patent, it being understood that the fuel supplied through main 63 controls the condition under regulation by the aforesaid apparatus.

The general arrangement of apparatus and the electrical connections are diagrammatically set forth in Figs. 8 and 9 of the drawings.

Referring more particularly to the former figure, the galvanometer 11 is indicated as connected in series, through a switch 65, with, for example, a thermocouple 66 which is utilized for the measurement of say the temperature prevailing within a furnace 67 in producing an E. M. F. representative of this temperature. This thermocouple is also in series with the slider 42 designed to move over the slide wire 43 as hereinbefore described. The slide wire 43 is included in a potentiometer circuit comprising the fixed resistance 68, an adjustable resistor 69, and the source of E. M. F. 70 and a further fixed resistance 71.

The other leg of the galvanometer circuit is connected to the aforesaid potentiometer circuit and preferably through a temperature compensating resistance 72. The standard cell 73 for checking the slide wire current may be included in the potentiometer circuit when desired, by throwing the switch 65 across the contacts 74, thereby cutting out the thermocouple, and a resistor 75 is connected permanently from a point between the resistors 68 and 69 to the galvanometer end of the compensating resistance 72, this resistance 75 being so proportioned to the rest of the circuit that when the correct value of current is flowing in the slide wire 43, the potential drop across resistance 75 will be equal to that developed by the standard cell 73. The hereinbefore described circuit is well known and there may be substituted therefor any one of the well known balancing circuits such as the Wheatstone bridge circuit.

In Fig. 9, which illustrates the motor circuits, power for operating the two motors 13 and 30 is taken from the power main 76 through lead 77 to the former and through leads 78 and 79 to the latter motor. With respect to the latter connection, the lead 78 is connected to the common side of the two contacts 19 and 20 which control the fields 80 and 81 of the motor 30.

In its simplest embodiment, the motor 30 operated under the influence of the novel galvanometer-controlled mechanism hereinbefore described, may, of course, control directly an electric motor-operated valve replacing the valve 62 and in manner well understood.

I claim:

1. Switch mechanism, for control by a deflecting member influenced by a condition to be controlled through two circuits, and comprising a pair of contactors having intersecting engaging surfaces, the contactors being included respectively in the said two circuits and adapted to individually engage directly with the deflecting member in accordance with its position to one side or the other of the control point and simultaneously substantially at the control point, together with means to move periodically said contactors simultaneously toward and away from said deflecting member.

2. Switch mechanism, for control by a deflecting member influenced by a condition to be controlled through two circuits, and comprising a pair of biased and pivoted contactors having intersecting engaging surfaces, the contactors being included respectively in the said two circuits and adapted to individually engage directly with the deflecting member in accordance with its position to one side or the other of the control point and simultaneously substantially at the control point, together with means to move periodically said contactors simultaneously toward and away from said deflecting member.

3. Switch mechanism, for control by a deflecting member influenced by a condition to be controlled through two circuits, and comprising a pair of contactors having intersecting engaging surfaces, the contactors being included respectively in the said two circuits and said couples each embodying a biased pivoted member and a stationary member cooperating therewith, and the former members being adapted to individually engage directly with the deflecting member in accordance with its position to one side or the other of the control point and simultaneously substantially at the control point, together with means to move periodically said contactors simultaneously toward and away from said deflecting member.

4. Switch mechanism, for control by a deflecting member influenced by a condition to be controlled through two circuits, and comprising a pair of contactors included respectively in the said two circuits and embodying pivoted members with intersecting inclined surfaces adapted for individual and simultaneous engagement with the deflecting member in accordance with its position to one side or the other of the control point and simultaneously substantially at the control point, together with means to move periodically said contactors simultaneously toward and away from said deflecting member.

5. Switch mechanism, for control by a deflecting member influenced by a condition to be controlled through two circuits, and comprising a pair of biased and pivoted contactors included respectively in the said two circuits and embodying pivoted members with intersecting inclined surfaces adapted to individually engage directly with the deflecting member in accordance with its position to one side or the other of the control point and simultaneously substantially at the control point, together with means to move periodically said contactors simultaneously toward and away from said deflecting member, and a member operative between the inclined surfaces for engagement with the deflecting member, when the latter is in neutral position, prior to its engagement with an inclined surface.

6. Switch mechanism, for control by a deflecting member influenced by a condition to be controlled through two circuits, and comprising a pair of biased and pivoted contactors included respectively in the said two circuits and embodying pivoted members with intersecting inclined surfaces adapted to individually engage directly with the deflecting member in accordance with its position to one side or the other of the control point and simultaneously substantially at the control point, together with means to move periodically said contactors simultaneously toward and away from said deflecting member, a member operative between the inclined surfaces for engagement with the deflecting member, when the latter is in neutral position, prior to its engagement with an inclined surface, and means to adjust the position of said member in a direction at right angles to the controlling movement of the deflecting member.

7. Switch mechanism, for control by a deflecting member influenced by a condition to be controlled through two circuits, and comprising a pair of biased and pivoted contactors included respectively in the said two circuits and embodying pivoted members with intersecting inclined surfaces adapted to individually engage directly with the deflecting member in accordance with its position to one side or the other of the control point and simultaneously substantially at the control point, together with means to move periodically said contactors simultaneously toward and away from said deflecting member, a member operative between the inclined surfaces for engagement with the deflecting member, when the latter is in neutral position, prior to its engagement with an inclined surface, and means to yieldingly urge toward the deflecting member said member operating between the inclined surfaces.

OZRO H. HUNT.